Figure 1:
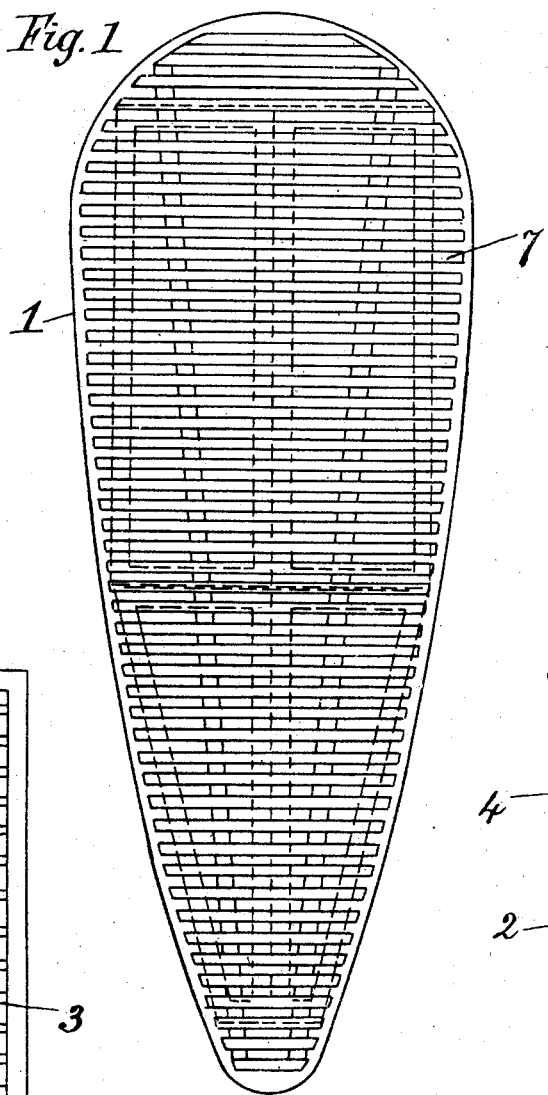

No. 879,326. PATENTED FEB. 18, 1908.
L. SARASON.
PROCESS OF AND APPARATUS FOR PREPARING EFFERVESCING BATHS.
APPLICATION FILED AUG. 12, 1907.

Witnesses:

Leopold Sarason
Inventor.

UNITED STATES PATENT OFFICE.

LEOPOLD SARASON, OF HIRSCHGARTEN, NEAR BERLIN, GERMANY.

PROCESS OF AND APPARATUS FOR PREPARING EFFERVESCING BATHS.

No. 879,326.   Specification of Letters Patent.   Patented Feb. 18, 1908.

Application filed August 12, 1907. Serial No. 388,261.

*To all whom it may concern:*

Be it known that I, LEOPOLD SARASON, a subject of the German Emperor, residing at Hirschgarten, near Berlin, in the German Empire, have invented certain new and useful Improvements in Processes of and Apparatus for Preparing Effervescing Baths, of which the following is a specification.

My invention relates to a process of preparing effervescing gas-water baths and to an apparatus for carrying said process into effect.

Prior processes of preparing effervescing gas-water baths consist either in the introduction into the water of chemicals, which by decomposition generate the gases in question in the water itself; or in conducting into the water a gas, such for instance as carbonic acid, from a vessel in which it is stored under high pressure independently of the actual bath.

According to my invention the gases are generated in the bath water itself. For this purpose the water is rendered electrically conducting by the addition of suitable chemicals, and then submitted to the action of the voltaic current, whereby it is decomposed into its gaseous elements, hydrogen and oxygen.

In effervescing baths the gaseous bubbles should be distributed as far as possible throughout the whole of the bath water. Such bubbles, however, only form directly at the place of contact of the electrodes with the water and then immediately ascend to the surface. It is, therefore, requisite that the current conductors be resolved into a very large number of electrodes, located close together over the bottom of the bath vessel. The electrodes must naturally be of some substance not liable to be attacked, preferably carbon. In employing such baths, I have found that a current of some 30–50 amperes with 5–6 volts tension is perhaps the most suitable, though stronger currents can be used without the bather remarking the effects of the current as such.

The generation of the gas bubbles depends solely upon the strength of the current. A special advantage of my new process, therefore, is that the degree to which gas is generated can be exactly regulated to suit the particular requirements of the patient taking the bath, and that the extent of generation can be maintained absolutely uniform.

In general the effervescing baths will probably be prepared by means of the gaseous mixture of oxygen and hydrogen obtained by the electrolysis of water. In this event the anodes and cathodes, which alternate with each other, will be located together at the bottom of the bath vessel.

One form of apparatus suitable for carrying out my improved process is illustrated in the accompanying drawing, this apparatus being designed for the preparation of a mixed oxygen and hydrogen effervescing bath.

Figure 2:
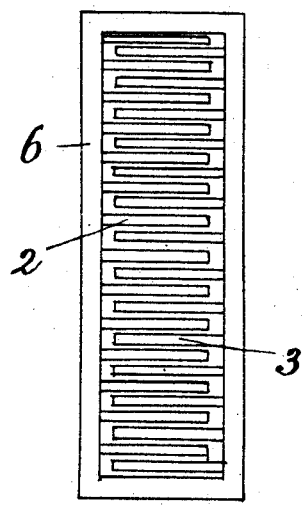
Figure 3:
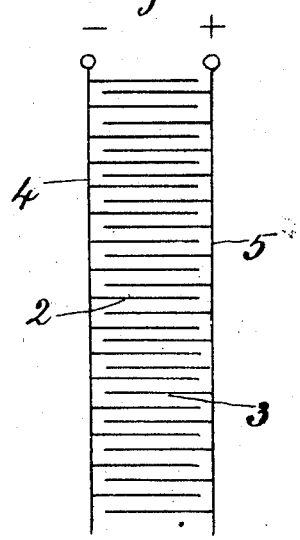

Figure 1 is a plan of the apparatus. Fig. 2 is a plan of one of the elements separately. Fig. 3 is a diagram illustrating the arrangement of the electrodes and their connecting rods.

At the bottom of the bath vessel 1 I distribute a large number of elements each consisting of an assemblage of parallel rod-shaped electrodes, the anodes 2 and the cathodes 3 alternating and being placed as near as possible to each other without contacting. The groups of anodes and cathodes respectively are joined by metal rods 4, 5, which again are connected with the source of current. The rods 4, 5, and the places of connection, are embedded in a suitable insulating material, while the two comb-shaped groups of anodes and cathodes lie exposed and project into each other. The elements may be furnished with a suitable frame 6 of wood or the like. The entire flat assemblage of elements is covered by a wooden latticework or like structure 7, which serves to support the body of the bather and guard it from direct contact with the electrodes.

By means of this apparatus mixed oxygen and hydrogen baths can be prepared, the water of which is thoroughly permeated with the gases and thus caused to effervesce uniformly all over.

Having thus described my invention, what I claim as new and desire to secure by Letters Patent of the United States is:—

1. The process of preparing effervescing gas-water baths, consisting in rendering water electrically conducting, and in electrolytically decomposing the same by means of electrodes distributed over the bottom of the water, substantially as described.

2. An apparatus for preparing effervescing gas-water baths, comprising a bath vessel, an assemblage of elements distributed over the bottom thereof, each element consisting of sets of anodes and cathodes which project into each other without actually contacting, and means located above said elements for protecting the body of the bather from direct contact with said electrodes, substantially as described.

In testimony whereof I affix my signature in presence of two witnesses.

LEOPOLD SARASON.

Witnesses:
WOLDEMAR HAUPT,
HENRY HASPER.